United States Patent
Wang et al.

(10) Patent No.: US 9,378,072 B2
(45) Date of Patent: Jun. 28, 2016

(54) MECHANISMS AND APPARATUS FOR EMBEDDED CONTROLLER RECONFIGURABLE INTER-PROCESSOR COMMUNICATIONS

(71) Applicant: GM GLOBAL TECHNOLOGY OPERATIONS LLC, Detroit, MI (US)

(72) Inventors: Shige Wang, Northville, MI (US); Chang Liu, Ann Arbor, MI (US); James K. Thomas, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 14/291,658

(22) Filed: May 30, 2014

(65) Prior Publication Data

US 2015/0347208 A1  Dec. 3, 2015

(51) Int. Cl.
  *G06F 3/00* (2006.01)
  *G06F 9/44* (2006.01)
  *G06F 9/46* (2006.01)
  *G06F 13/00* (2006.01)
  *G06F 9/54* (2006.01)
  *G06F 15/82* (2006.01)

(52) U.S. Cl.
  CPC .............. *G06F 9/546* (2013.01); *G06F 15/82* (2013.01)

(58) Field of Classification Search
  None
  See application file for complete search history.

(56) References Cited

U.S. PATENT DOCUMENTS

| | | | |
|---|---|---|---|
| 5,313,578 A | 5/1994 | Handorf | |
| 5,544,316 A | 8/1996 | Carpenter et al. | |
| 6,226,689 B1 | 5/2001 | Shah et al. | |
| 6,334,177 B1* | 12/2001 | Baumgartner | G06F 9/5077 709/221 |
| 7,386,858 B1 | 6/2008 | Peacock et al. | |
| 7,418,720 B2 | 8/2008 | Dean | |
| 8,001,266 B1* | 8/2011 | Gonzalez | G06F 15/177 370/351 |
| 8,286,188 B1* | 10/2012 | Brief | G06F 9/544 719/312 |
| 2003/0208616 A1* | 11/2003 | Laing | H04L 12/2697 709/236 |
| 2011/0173635 A1* | 7/2011 | berg | G06F 13/32 719/312 |

* cited by examiner

*Primary Examiner* — H S Sough
*Assistant Examiner* — William C Wood
(74) *Attorney, Agent, or Firm* — John A. Miller; Miller IP Group, PLC

(57) ABSTRACT

A system and method for reconfigurable inter-processor communications in a controller. The system and method include providing multiple processors in the controller and generating a send buffer and a receive buffer for each of the processors. The system and method further include generating a send table and a receive table for each of the processors where the send table stores identifying information about messages being sent and where the receive table stores identifying information about messages being received, and providing infrastructure services that include protocols for sending and receiving messages between multiple processors in the controller.

19 Claims, 8 Drawing Sheets

MECHANISMS AND APPARATUS FOR EMBEDDED CONTROLLER RECONFIGURABLE INTER-PROCESSOR COMMUNICATIONS

BACKGROUND OF THE INVENTION

1. Field of the Invention

This invention relates generally to a system and method for reconfiguring inter-processor communications and, more particularly, to a system and method that provides multiple processors that include a send and receive buffer, a send and receive table, and infrastructure software services that include protocols for sending and receiving messages between the processors in a controller.

2. Discussion of the Related Art

Modern vehicles employ various embedded electronic controllers that improve the performance, comfort, safety, etc. of the vehicle. Such controllers include engine controllers, suspension controllers, steering controllers, power train controllers, climate control controllers, infotainment system controllers, chassis system controllers, etc. These controllers typically require special purpose software and algorithms to perform their control functions.

The current trend for vehicle electronic controllers is to provide multiple software applications for different functions operating on a common controller. For example, adaptive cruise control (ACC) systems, lane centering systems, lane keeping systems, stability control systems, etc. are all known in the art all of which automatically control vehicle steering and/or braking in some fashion. These systems often times employ the same sensor inputs and other variables, sometimes referred to as global variables, that when stored in memory can be used by more than one software application. For example, the ACC system may write sensor data into the controller memory during its operation on the processor, and the lane centering system may write that data into its software when it is running on the processor. Thus, it makes sense in many cases such as these to run multiple software applications on the same processor.

Providing multiple related software applications running on a common controller has obvious advantages for reducing system hardware and cost. However, operating different software applications on the same processor increases the complexity of the controller because of the scheduling required to run the different software applications and prevent the software applications from interfering with each other. Such mixed use applications operating on a single processor is further increased in complexity when a vehicle OEM provides additional software on a controller already having software provided by a supplier. Furthermore, a single processor has only limited resources such as memory, CPU throughput, etc., available. The resources needed to run multiple applications often exceed the capability of a single processor.

Inter-processor communication (IPC) is a set of methods for exchanging data among multiple threads in one or more processes. The one or more processes or runnables may be running on one or more processors connected by a network. As used herein "runnable" includes a small executable software component or software function running at a certain operating system task rate. In inter-processor communications, runnables may be assigned to different processors. Runnables may also run in different threads with different rates. Assignment of runnables requires frequent change which can be burdensome with respect to throughput of cores/processors as well as with respect to bandwidth of a bus/memory. Current practice assumes that runnables may not be reassigned during design becomes infeasible. Messages in known controller implementations include node-specific syntax, i.e., hard coded source/target information. Moving runnables from one core to another requires nontrivial effort to identify and modify IPC messages. Thus, there is a need in the art for mechanisms that allow reconfiguration of inter-processor communication according to various function deployment, function execution rates, and low level communication links.

SUMMARY OF THE INVENTION

The following disclosure describes a system and method for a system and method for reconfigurable inter-processor communications in a controller. The system and method include providing multiple processors in the controller and generating a send buffer and a receive buffer for each of the processors. The system and method further include generating a send table and a receive table for each of the processors where the send table stores identifying information about messages being sent and where the receive table stores identifying information about messages being received, and providing infrastructure services that include protocols for sending and receiving messages between multiple processors in the controller.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for reconfiguring inter-processor communications is merely exemplary in nature, and is in no way intended to limit the invention or its applications or uses.

Figure 1C:
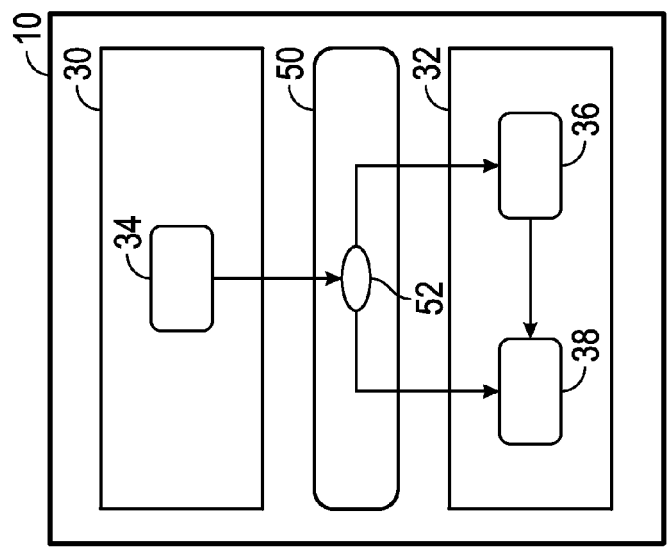
FIGS. 1a-1c illustrate a controller with runnables that are configured on first and second processors according to two different configurations.
Figure 1B:
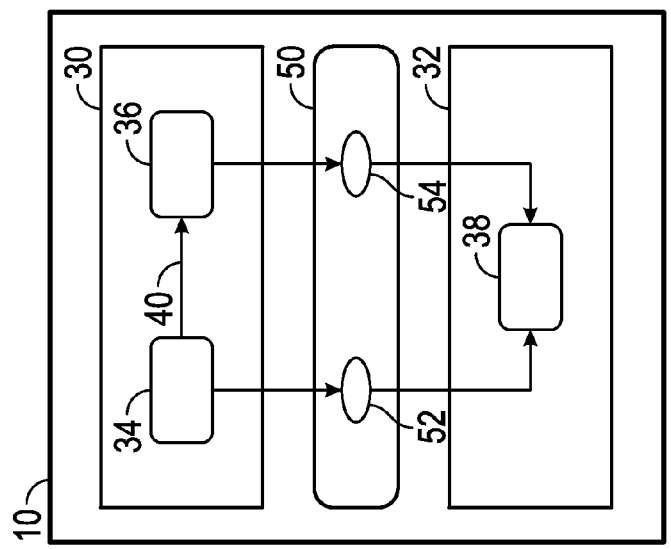
Figure 1A:
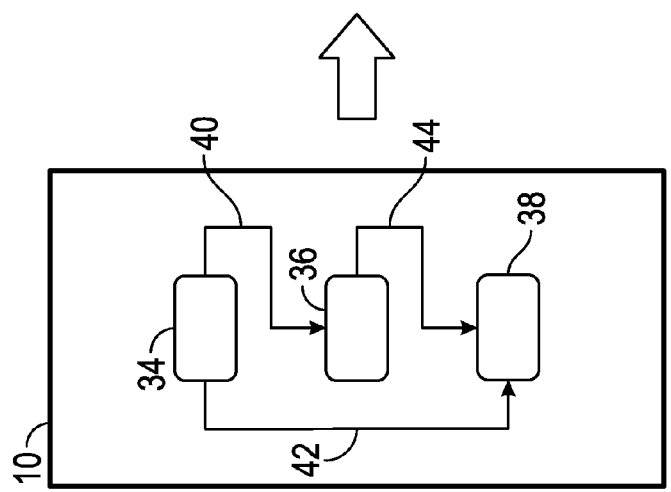

FIG. 1a illustrates a controller 10, such as a controller on a vehicle that includes runnables 34, 36 and 38. FIGS. 1b and 1c illustrate the runnables 34, 36 and 38 arranged on processors 30 and 32, respectively, according to two different configurations. FIG. 1a illustrates how data signals are shared among the runnables 34, 36 and 38. As shown in FIG. 1a, runnable 34 sends signal data to runnable 36 on line 40 and also sends signal data to runnable 38 on line 42. Runnable 36 sends signal data to runnable 38 on line 44. Runnable 34 may be, for example, vehicle sensor input data. Runnable 36 may be a vehicle path prediction filter, and runnable 38 may be a collision potential detection process.

FIG. 1b illustrates runnables 34, 36 and 38 distributed on processors 30 and 32. According to this configuration two messages 52 and 54 are sent on a communications link 50, such as a bus. FIG. 1c illustrates runnables 34, 36 and 38 distributed on processors 30 and 32 in a different way such that only one message needs to be send on the communications link 50. Thus, varying the configuration of runnables such as the runnables 34, 36 and 38 may be desirable to optimize throughput of processors such as processors 30 and 32 as well as efficiently use bandwidth of the communications link 50 as well as memory of the controller 10.

To create a way to reconfigure inter-processor communications a protocol that is encoded in a static message structure, circular buffers for message storage and infrastructure services are used as described in detail below. The protocol for sending and receiving messages is built within a message structure with reduced overhead, i.e., is a high-level protocol that is different from a network protocol. The protocol for sending and receiving messages is capable of supporting multiple message rates based on a consumer's needs for bandwidth and throughput optimization, which is different from the existing fixed rate solutions because, as stated above, these solutions unnecessarily consume extra bandwidth and throughput. Thus, the protocol for sending and receiving messages as described herein enables robust communications and allows for implementation of various diagnostic and fault tolerant strategies. The message structure for the protocol for sending and receiving messages includes a leading byte, referred to herein as _sync, that indicates the start of a message. The _sync is used to identify a new message in the case of header corruption. The message structure also includes a system-wide, unique encoding signal(s)/action(s), referred to herein as _id, which has a predetermined rate packed to transmit between a send location and a destination, described in more detail below. The send location, referred to herein as _src, is the core/processor that is receiving the signals/message. Also included in the message structure is a message rolling count, referred to herein as _cnt, which is a sequence number of the particular message structure that is unique for each _id, _src, _dst. For example, the _cnt may represent a packet of multiple messages such that a message missing from the middle of the packet is detected, as discussed further below.

The message structure of the protocol for sending and receiving messages also includes information regarding the length of the message, referred to herein as _size. The _size is statically determined and is used to ensure correct receiving of a message because _size indicates when the message will end or is expected to end. Detection of header data corruption, referred to herein as _hdr_chksum, is also part of the message structure of the protocol. Verification that data in the message is from the same source, to the same destination, at the same rate, referred to herein as _data, is also part of the message structure. Further, the message structure includes what is referred to herein as _data_checksum, which is used by a core/processor receiving the signals such as the processor 32, to detect data corruption. If data corruption is detected, the data is dropped to save storage space in a manner described below.

TABLE 1

| msg id | dst | cnt | size | v-list |
|--------|-----|-----|------|--------|
| m1     | p2  | 5   | 10   | V1, V3, V8 |
| m2     | p2  | 3   | 10   | V1, V2, V8 |
| m3     | p3  | 1   | 8    | V3, V4 |
| ...    | ... |     | ...  | ... |

Table 1 illustrates how signal data is organized in a send table of the sending core/processor such as the processor 30. Each processor includes a send table and a receive table, as is described in more detail below. Each row of Table 1 includes _id, _dst, _size and a variable list with variable references and positions. Data is organized statically in a message, where the position of a signal in the message is fixed and determined at a configuration time. As shown in Table 1, a message m1 is being sent to a core/receive processor p2, has a count of 5 and a size of 10. The variable sequence for m1 is V1 followed by V3, followed by V8. A second message in Table 1, m2, is also being sent to the receive core/processor p2, has a count of 3 and a size of 10, and a variable sequence of V1 followed by V2 followed by V8. A third message, shown as m3 in Table 1, is being send to a receive core/processor p3, has a count of 1, a size of 8 and the variable sequence is V3 followed by V4.

TABLE 2

| msg id | Src | cnt | Size | v-list |
|--------|-----|-----|------|--------|
| m1     | p1  | 5   | 10   | V1, V3, V8 |
| m2     | p1  | 2   | 10   | V1, V2, V8 |
| m5     | p3  | 2   | 6    | V7, V5 |
| ...    | ... | ... | ...  | ... |

Table 2 illustrates a receive table of the receive core/processor such as the processor 32. Each row of Table 2 includes _id, _src, _size and a variable list with variable references and positions. As stated above, the _id, _src, and _size are used to receive messages correctly in the presence of header corruption. For example, the size of the message m1 is expected to be 10, thus if the actual size is not 10 the message is dropped as discussed further below. The message m1 in Table 1 is expected to match the message m1 in Table 2. Using the information in the rows of Tables 1 and 2, the receiving core/processor 32 is able to determine if the message received is correct, i.e., has not been corrupted. As stated above, each core/processor maintains two tables, one for sending and one for receiving. Both tables are generated at the time of deployment, i.e., at the time of design, and the count, _cnt of the message structure is used at the receiving side to determine if a message is to be dropped.

Figure 2:
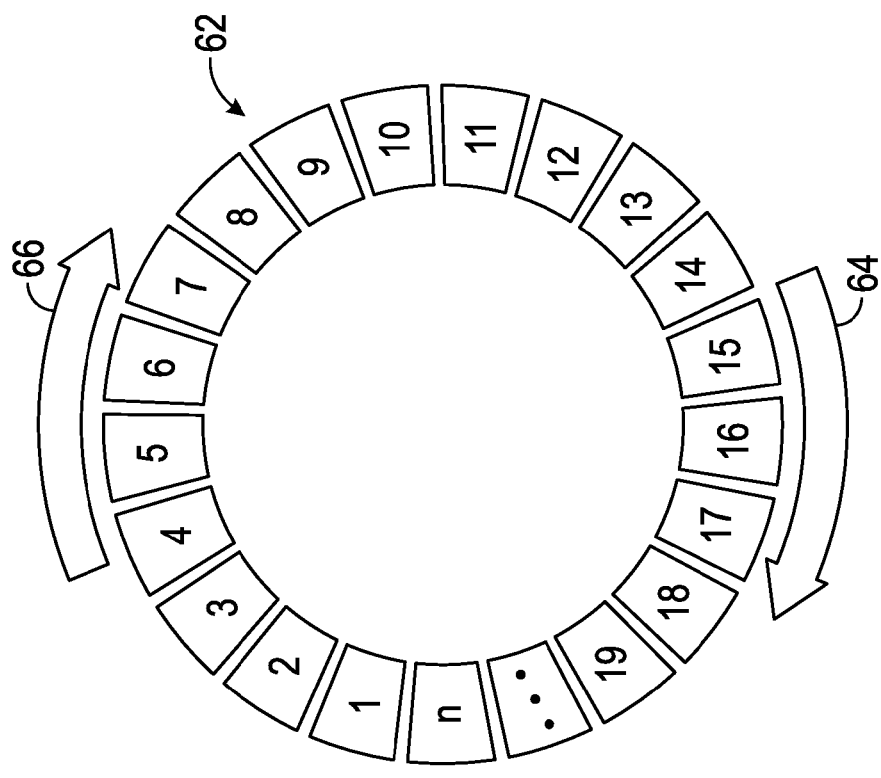
FIG. 2 is an illustration message buffers that are part of each processor.
Figure 2:
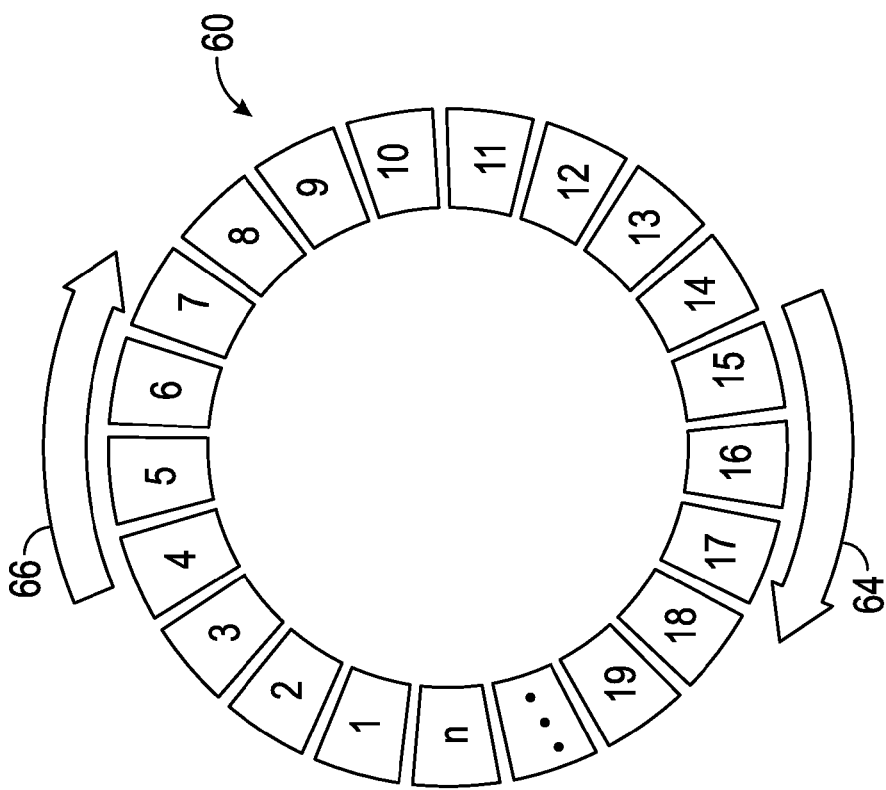

FIG. 2 illustrates message buffers 60 and 62 that are part of each core/processor, such as the processors 30 and 32. The message buffer 60 is a send buffer that is used to store a sent message before processing the sent message, by delivering the message across a bus for example, as described in more detail below. The buffer 62 is a receive buffer that is used to store a received message before processing the received message as described in detail below. Each of the buffers 60 and 62 are circular buffers, where each of the buffers 60 and 62 include two pointers. A first pointer 64 points to where the buffer is written to and the other pointer 66 points to where the buffer is read from. To determine the size that the send buffer 60 needs to be, the following equation is used:

$$B_{send} = \Sigma_{\forall j \in rate} \Sigma_{\forall i \in dst} \text{sizeof}(m_{i,j}) \qquad (1)$$

Where $B_{send}$ is the allocated size for the send buffer, $\forall j \in$ rate means the sum over all the possible rates at which the data to be transmitted are generated, ∀i∈dst means the sum over all the possible destination processors/cores and sizeof ($m_{i,j}$) is the size of the message including the header and the data.

Using equation (1), an algorithm calculates the size, _size, or length of each message to ensure the send buffer 60 is capable of holding the all of the data communications it is expected to receive between each Tx_task, i.e., between each write command task that writes data communications to the buffer 30. For example, the buffer 60 may be expected to receive 20 data communications from the runnable R1 and 1 data communication from the runnable R2. If the size of each data communication is 1 and the size of the message header is 10, the buffer size may be calculated as 20*(10+1)+(10+1)=231 Similarly, to determine the size that the receive buffer 32 needs to be, the following equation is used:

$$B_{receive} = \Sigma_{\forall j \in rate} \Sigma_{\forall i \in src} \text{sizeof}(m_{i,j}) \qquad (2)$$

Where $B_{receive}$ is the size allocated for the receive buffer, ∀j∈rate means the sum over all the possible rates at which the data communications are generated, and ∀i∈src means the sum over all the messages coming from different source processors, and sizeof ($m_{i,j}$) is the size of the message including the header and the data.

The equation (2) is used to calculate the size, _size, or length of each message to ensure the circular buffer 32 is capable of holding all of the data communications it is expected to receive between each Rx_task, e.g., each read command task that takes things from the buffer 30 to put on the bus 50. Using the pointer 66 to read and the pointer 64 to write, a function, described in detail below, writes the data sequentially starting at a write index, i.e., starting at the pointer 64. A separate task function, described in detail below, is invoked at the highest rate of the sent messages to read a message to-be-sent from the read pointer 66 of the send buffer 62, formulates the message and sends the message to the communication link, e.g., a bus, in a manner described below. At the receive side, an interrupt service, described in detail below, is invoked upon the arrival of a message such that the interrupt service checks the message header and compares it to information available in a receive table such as Table 2. A valid message is placed into the receive buffer 62, and a receive task that is invoked at the highest rate of the received messages unpackages the signal data of the message and copies the signal data to the appropriate variables in a manner described in more detail below. The size of the buffers 60 and 62 are computed using equations (1) and (2), described above, to ensure overflow of the signal data does not occur.

The infrastructure services for message processing on each core/processor 30, 32 includes a Tx_func( ) 70, a Tx_task( ) 90, an Rx_interrupt( ) 112 and an Rx_task( ) 134 as described in more detail in FIGS. 3-6 below.

Figure 3:
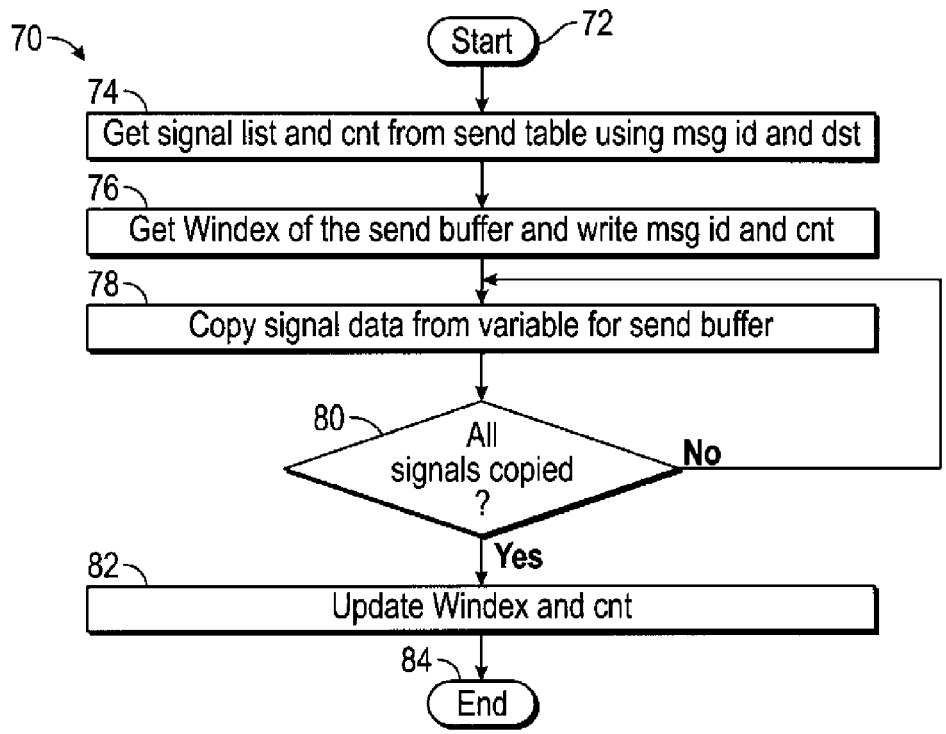
FIG. 3 is a flow diagram of a function that is part of a sending processor.

FIG. 3 is a flow diagram of the Tx_func( ) 70 that is a function of the sending core/processor 30. When there is a message generated by the runnable running at a certain rate and to be sent from the send core/processor 30 via inter-process communications, such as the message m1 of Table 1, the Tx_func( ) 70 begins at box 72. At box 74, the Tx_func( ) 70 uses message id, _id, and destination, _dst, to acquire a signal list and count, _cnt. The Windex (i.e., write index) of the send buffer 60 is acquired and used to write the message id and count at box 76. At box 78 the signal data from the variables, in the example of message m1 the variables V1, V3 and V8, to the send buffer 60. At decision diamond 80 the Tx_func( ) 70 determines if all the signal data from the variables V1, V2 and V8 were successfully copied. If so, the Windex and count are updated at box 82. If not, the Tx_func( ) 70 returns to the box 78 to recopy the variable data.

Once the Windex and count are updated at box 82 the Tx_func( ) 70 ends at box 84. The Tx_func( ) 70 is called each time the runnable executes.

Figure 4:
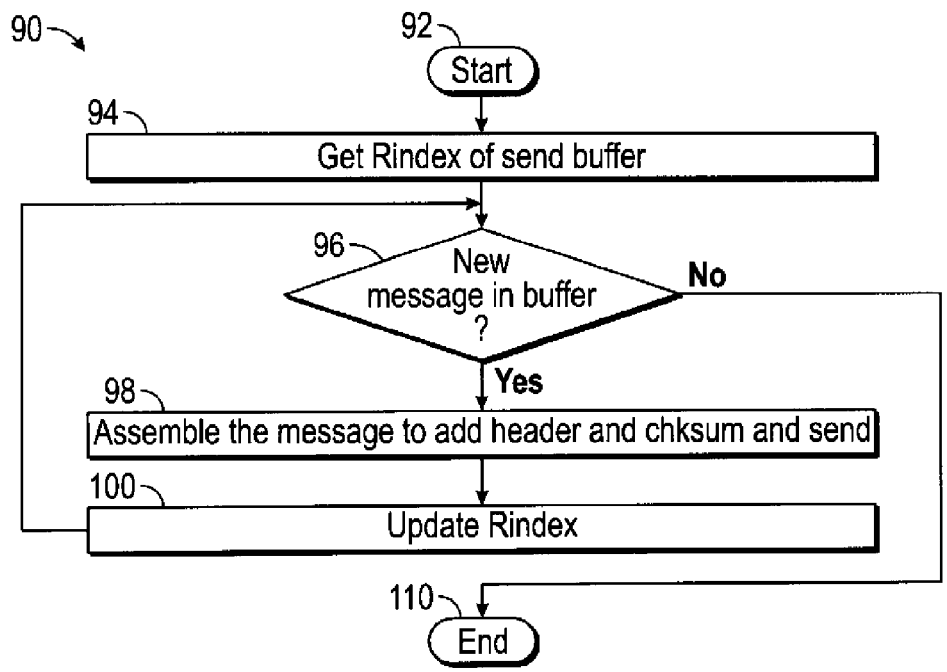
FIG. 4 is a flow diagram of a task that sends messages to a buffer of the sending core/processor.

FIG. 4 is a flow diagram of the Tx_task( ) function 90. Tx_task( ) 90 is a periodic task that pulls the messages from the send buffer and sends them on the communication link 50 such as a bus. At box 92 the Tx_task( ) 90 begins. The Rindex (i.e., the read index) of the send buffer 60 is acquired at box 94. The Tx_task( ) 90 determines if there is a new message in the buffer 60 at decision diamond 96. If not, the Tx_task( ) 90 ends at box 110. If there is a new message in the buffer 60, the message is assembled to add header and _chksum and the message is sent via inter-processor communication at box 98. Once the message is sent the Rindex of the buffer 60 is updated at box 100 and the Tx_task( ) 90 returns to decision diamond 96 to determine if there is another new message in the buffer 60.

Figure 5:
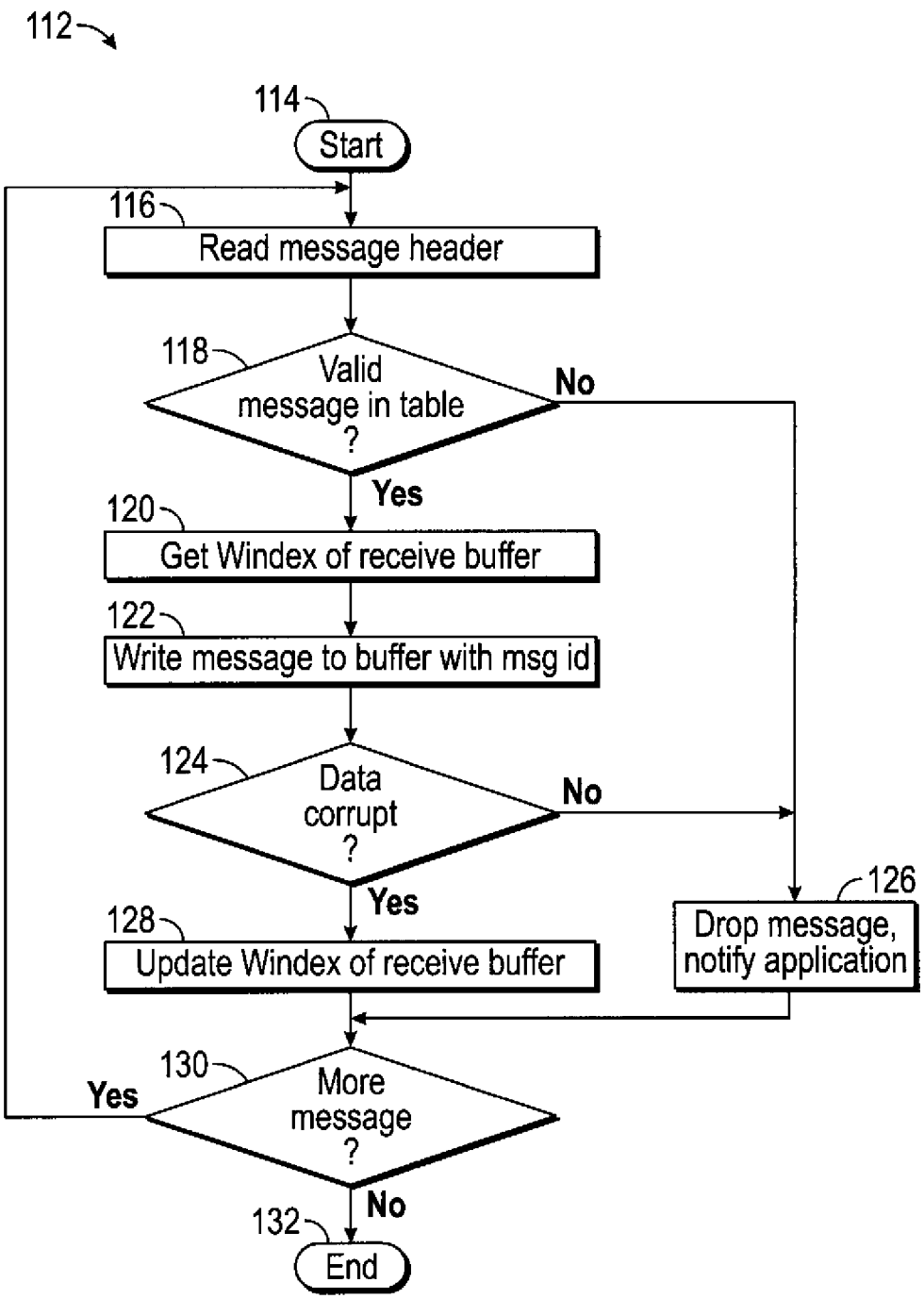
FIG. 5 is a flow diagram of a function that copies messages sent to a buffer of the receiving core/processor.

FIG. 5 is a flow diagram of a Rx_interrupt( ) 112 that copies messages from the physical inter-processor communications link 50 to the receive buffer of the destination processor. At box 114 the Rx_interrupt( ) 112 is triggered by the arrival of a message. At box 116 the message header is read. The Rx_interrupt 112 determines if this is a valid message based on the receive table locally stored at decision diamond 118. The valid message check includes determining if any unmatched header information (_sync, _id, _src, _dst, _cnt, _hdr_chksum) indicates some corruption leads to a message drop if unmatched header information is present. If there is a valid message, the Windex (i.e., the write index) of the receive buffer 62 is acquired at box 120 and the message is written to the buffer 62 with message id information at box 122. At decision diamond 124 the Rx_interrupt 112 determines if the data is corrupt. If the data is corrupt or if this was not a valid message configured in the receive table at the decision diamond 118, the message is dropped at box 126 and the application is notified such that the application may determine what to do. If the data is not corrupt at the decision diamond 124, the Windex of the receive buffer 62 is updated at box 128. At decision diamond 130 the Rx_interrupt 112 determines if another message has been received via inter-processor communications. If so, the Rx_interrupt 112 returns to the box 116 to read the message header of that message. If another message has not been received, the Rx_interrupt 112 ends at box 132.

Figure 6:
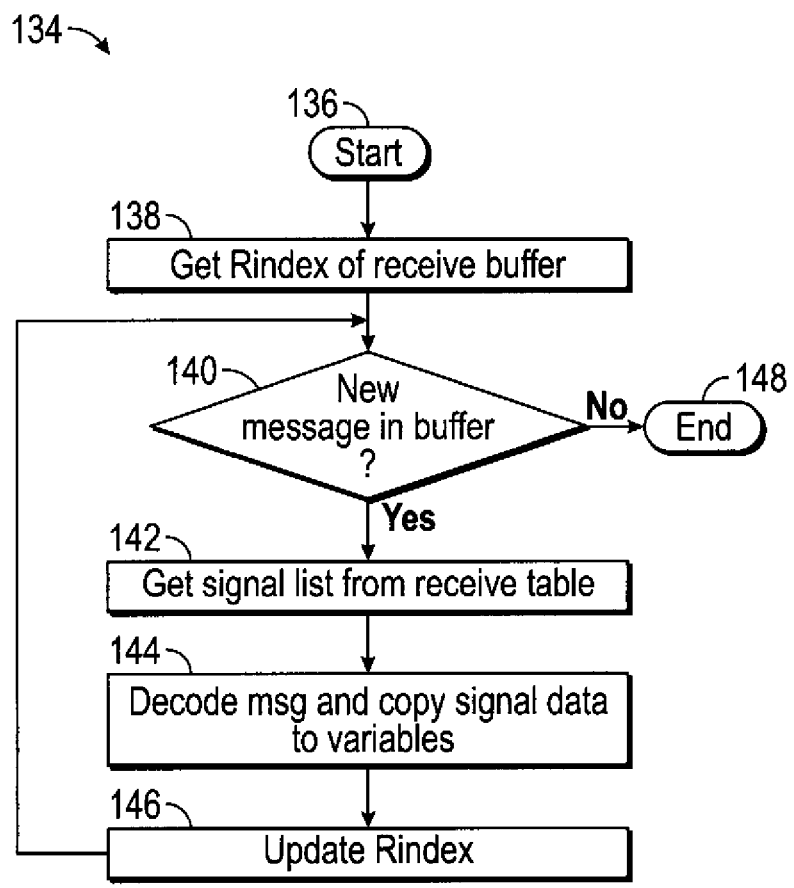
FIG. 6 is a flow diagram of a task that copies signal data in a message to an appropriate variable.

FIG. 6 is a flow diagram of the Rx_task( ) function 134 that parses messages received in the receive buffer and copies signal data in a message to the appropriate variable. The Rx_task( ) 134 is a periodic task that is running. The Rx_task( ) 134 begins at box 136 and acquires the Rindex (i.e., the read index) of the receive buffer 62 at box 138. The Rx_task( ) 134 determines if there is a new message in the buffer 62 at decision diamond 140. If not, the Rx_task( ) 134 ends at box 148. If so, a signal list is acquired from a receive table such as Table 2 at box 142 and the message is decoded and the signal data is copied to the appropriate variables at box 144. Once copying of the signal data is complete at the box 144 the Rindex of the buffer 62 is updated and Rx_task( ) 134 returns to the decision diamond 140 to determine if there is another new message in the buffer 62.

Figure 7:
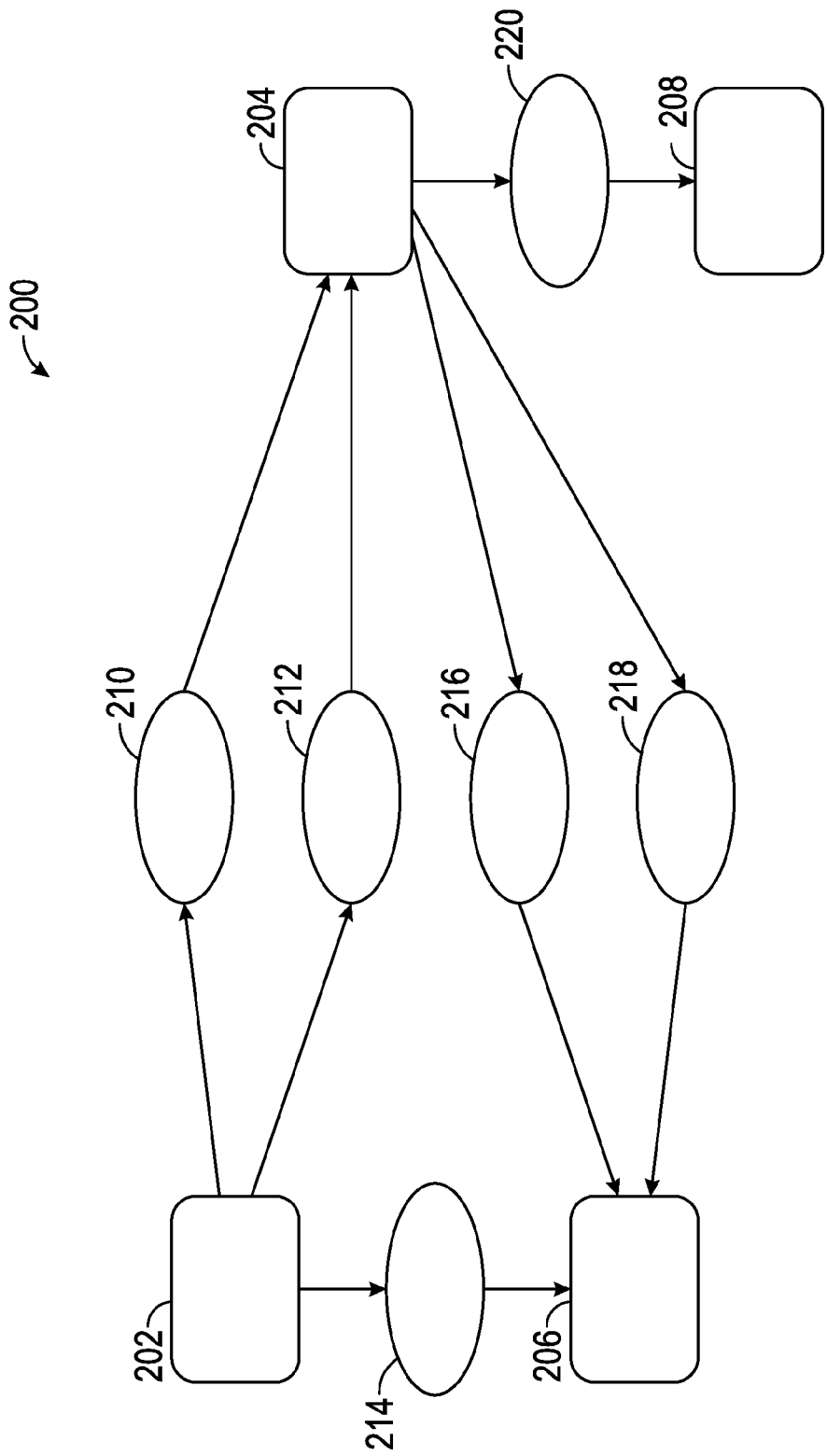
FIG. 7 is an illustration of an example of how four runnables, R1, R2, R3 and R4 communicate with each other.

FIG. 7 is an illustration of an example 200 of how four runnables, a runnable R1 at box 202, a runnable R2 at box 204, a runnable R3 at box 206 and a runnable R4 at box 208, communicate with each other. Each circle in FIG. 7 is a data communication that is being sent from one runnable to another. Each data communication includes variables that are written by a sending runnable and read by a receiving runnable. Data communications 210 and 212 are communication that include variables V12a and V12b, respectively, that have a size of 6 and 4, respectively, and are written by the runnable R1 every 5 milliseconds, and sent to the runnable R2. Data communication 214 is a data communication that includes variable V13 that has a size of 4 and that is written by the runnable R1 every 5 milliseconds and sent to the runnable R3 as a message m1. Data communications 216 and 218 are communications that include variables V23a and V23b, respectively that have a size of 6 and 4, respectively, and that are written by the runnable R2 every 10 milliseconds and sent to the runnable R3 as a message m2. Data communication 220 is a data communication that includes variable V24 that has a size of 2 and that is written by the runnable R2 every 10 milliseconds and sent to the runnable R4 as a message m3.

Figure 8:
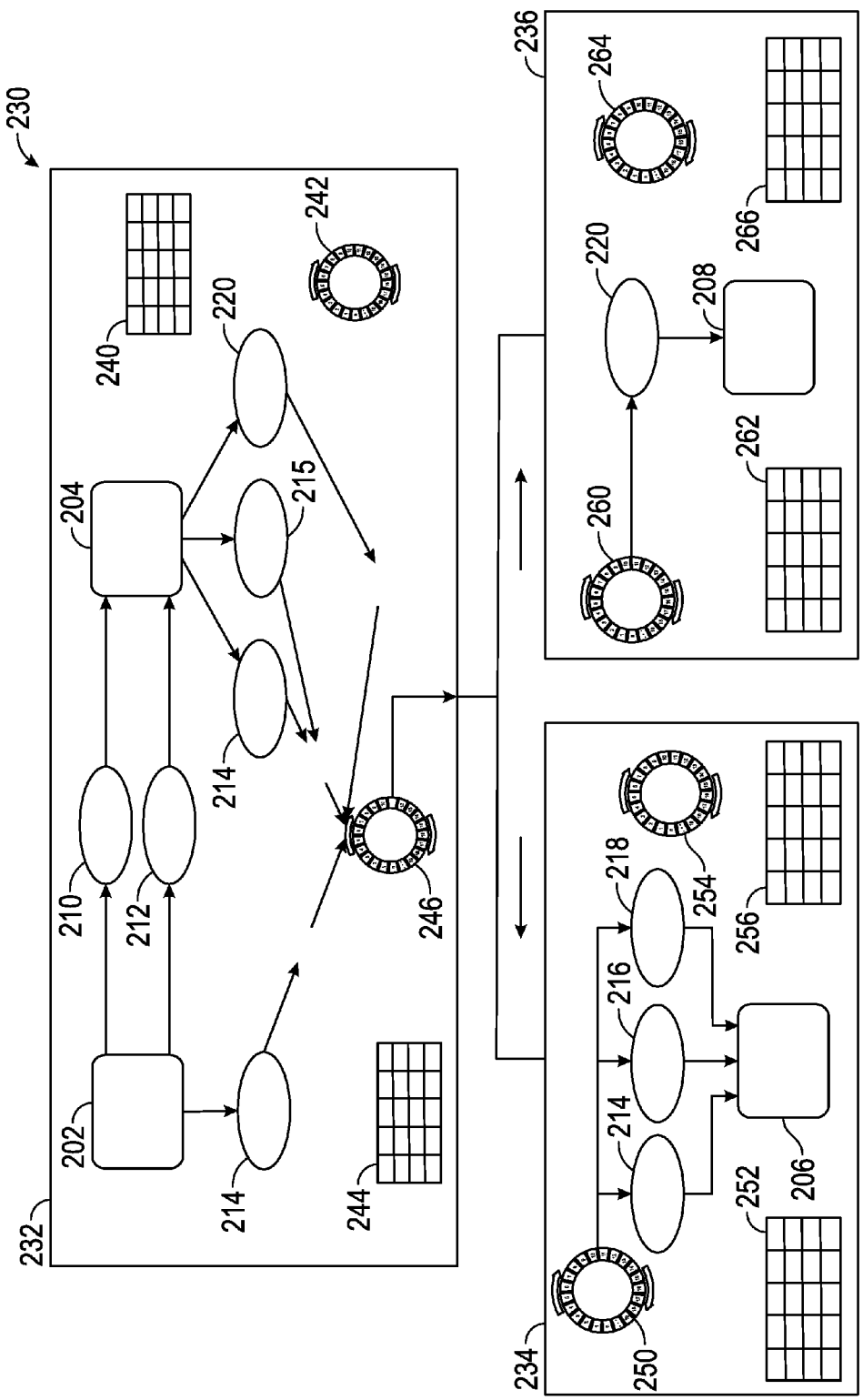
FIG. 8 is an illustration of a controller that includes the runnables R1, R2, R3 and R4 distributed among three cores/processors.

FIG. 8 is an illustration of a controller 230 that includes the runnables R1, R2, R3 and R4 described above in FIG. 7. The runnables R1, R2, R3 and R4 are distributed among three cores/processors, where the reference numerals of FIG. 7 are used to refer to like elements in FIG. 8. A first processor 232 includes the runnable R1 at the box 202 and the runnable R2 at the box 204. A second processor 234 includes the runnable R3 at the box 206, and a third processor 236 includes the runnable R4 at the box 208. Tables and buffers for each of the processors 232, 234 and 236 are generated at the time of configuring the controller 230. According to this example, a receive table 240 of the first processor 232 is empty because messages are not sent to the first processor 232. Similarly, the size of a receive buffer 242 is zero because messages are not received.

A send table 244 includes all the messages that will be sent out of the processor 232 by a send buffer 246. Thus, the send table 244 contains the information of Table 3:

TABLE 3

| msg id | dst | cnt | size | v-list |
|---|---|---|---|---|
| m1 | p2 | 1 | 4 | V13 |
| m2 | P2 | 1 | 6 + 4 | V23_a, V23_b |
| m3 | p3 | 1 | 2 | V24 |

As shown in Table 3, the send buffer 246 sends the data communication 214 from the runnable R1 as m1 and also sends the data communications 216, 218 as m2 and the data communication 220 from the runnable R2 as m3. The Tx_task period of the send buffer 246 is every 10 milliseconds, and the message header size is 10, i.e., the total size of fields beside the data payload is 10. Using equation (1) above, the size of the send buffer 246 is calculated as 2*(10+4)+(10+6+4)+(10+2)=60. Once the send buffer 246 writes messages m1, m2 and m3 that contain the appropriate data communications, the messages m1 and m2 are sent to the second processor 234 and the message m3 is sent to the third processor 236. Because the message m1 is from the runnable R2, two messages m1 will be created (one every 5 milliseconds) by the time the send buffer 246 writes (occurs every 10 milliseconds).

The second processor 234 includes a receive buffer 250 that receives incoming data communications and a receive table 252 that contains the information of Table 4:

TABLE 4

| msg id | src | cnt | size | v-list |
|---|---|---|---|---|
| m1 | P1 | 1 | 4 | V13 |
| m2 | P1 | 1 | 6 + 4 | V23_a, V23_b |

According to this example, a send buffer 254 of the second processor 234 has a size of zero and a send table 256 is empty because the second processor 234 does not send data communications. The read task Rx_task of the receive buffer 250 is every 10 milliseconds. Thus, using the equation (2) above, the size of the receive buffer 250 is calculated as 2*(10+4)+(10+6+4)=48, where we again assume that the header size is 10.

The third processor 236 receives the message m3 that includes the data communication 220 from the runnable R2 of the first processor 232. A receive buffer 260 receives the message m1, and a receive table 262 contains the information shown in Table 5:

TABLE 5

| msg id | src | cnt | size | v-list |
|---|---|---|---|---|
| m3 | p1 | 1 | 2 | V24 |

A send buffer 264 of the third processor 236 has a size of zero and a send table 266 is empty because the third processor 236 does not send data communications according to this example.

FIG. 8 described above illustrates four runnables on three processors. This configuration is one option which may be changed if desired.

Figure 9:
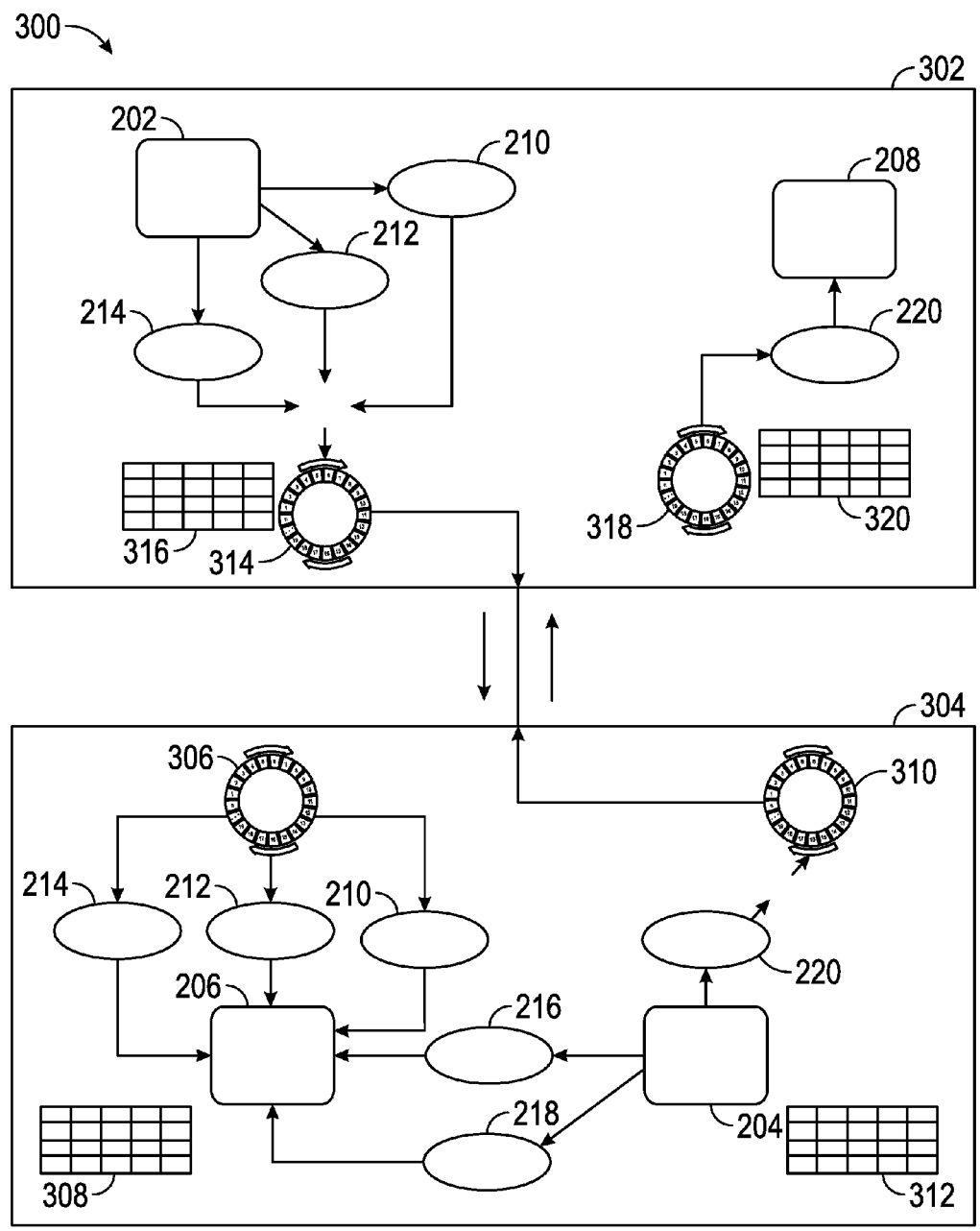
FIG. 9 is an illustration of a controller that includes the runnables R1, R2, R3 and R4 distributed among two cores/processors.

FIG. 9 is an illustration of a controller 300 that includes the runnables R1, R2, R3 and R4 described above in FIG. 7 in a different configuration such that the runnables R1, R2, R3 and R4 are distributed among two processors instead of three processors as shown in FIG. 8. Reference numerals are the same for like elements shown in FIGS. 7 and 8. A first processor 302 includes the runnable R1 at the box 202 and the runnable R4 at the box 208. A second processor 304 includes the runnable R2 at the box 204 and the runnable R3 at the box 206. According to this example a receive buffer 306 receives the data communications 210, 212 and 214 from the runnable R1 in a message m1 and a send buffer 310 sends the data communication 220 from the second processor 304 to the first processor 302 in a message m3. A receive buffer 318 of the first processor has an Rx_task period of 30 milliseconds and receives the data communications 220 of message m1.

The send table 316 of the first processor 302 contains the information shown in Table 6:

TABLE 6

| msg id | dst | cnt | size | v-list |
|---|---|---|---|---|
| m1 | p2 | 1 | 4 + 2 + 4 | V13, V12_a, V12_b |

Based on the information regarding message size as shown in Table 6, and assuming the header size is 10, thus using equation (1) above, the size of the send buffer 314 is calculated to be=(10+10)=20, because in this example the runnable R1 runs at 5 ms and the Tx_task runs also at 5 ms.

In this example, because the first processor 302 receives messages, the receive buffer 318 is not zero and the receive table 320 is not empty. Instead, the receive table 320 contains the information shown in Table 7:

TABLE 7

| msg id | src | cnt | size | v-list |
|---|---|---|---|---|
| m3 | p2 | 1 | 2 | v24 |

As shown in Table 7, the message size is 2. The receive buffer 318 task rate is 30 milliseconds while the task rate of the send buffer 310 is 10 milliseconds. Thus, 3 messages will build up in the receive buffer 318 before the messages will be read. Assuming again the header size is 10, the size the receive buffer 318 is calculated using equation (2) above to be=3*(10+2)=36.

In the second processor 304, the receive table 308 of the second processor 304 contains the information shown in Table 8. The size of the receive buffer 306 is calculated using equation (2) above, i.e., =2*(10+10)=40 because the message m1 comes from the communication link 50 every 5 ms, while the Rx_task on the second processor 304 runs every 10 ms. Thus, Table 8 includes:

TABLE 8

| msg id | src | cnt | size | v-list |
|---|---|---|---|---|
| m1 | p1 | 1 | 10 | V13, V12_a, V12_b |

The second processor 304 sends a message m3 to the first processor 302, as stated above. Thus, the send table 312 of the second processor 304 contains the information shown in Table 9:

TABLE 9

| msg id | dst | cnt | size | v-list |
|---|---|---|---|---|
| m3 | p1 | 1 | 2 | V24 |

The header size is assumed to be 10 as stated above. Thus, the size of the send buffer 310 is calculated using equation (1) above, i.e., =10+2=12 because the runnable R2 and the Tx_task on the second processor 304 both run at 10 ms.

FIG. 9 illustrates the same runnables R1, R2, R3 and R4 according to a different configuration. The configuration shown in FIG. 8 may be reconfigured to be allocated as shown in FIG. 9 by switching tables, buffer sizes and SW components, all of which are pre-defined and pre-stored. For example, if the third processor 236 in FIG. 8 fails, the controller 232 may be reconfigured to be the controller 300 by changing the tables and buffer such that the runnable R4 is moved from the third processor 236 to the first processor 302 and the runnable R2 is moved from the first processor 232 to the second processor 304. The so-called moving is achieved by changing the content of the send and receive tables of the processors from what they contain in FIG. 8 to the send and receive tables of FIG. 9 and by changing the size of the buffers from what they are in FIG. 8 to the size of the buffers in FIG. 9.

The reconfigurable system and method described above allows for true parallel implementation of applications and components without having to know the deployment. Bandwidth and central processing unit throughput is improved via supporting flexible reassignment of the function execution location and the communication frequency. As stated above, existing inter-processor communications in supplier systems require a fixed location of applications and only transmit messages at a fixed rate, which unnecessarily consumes extra bandwidth and throughput. The protocol above provides robust communication and enables independence of low level communication implementations that may be acquired from suppliers.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for reconfigurable inter-processor communications in a controller, said method comprising:
providing multiple processors in the controller, said multiple processors running at least one runnable of the controller;
encoding a protocol in each message created by the processors, said protocol for sending and receiving messages from one processor to another processor;
providing a send buffer for messages that are to be sent and providing a receive buffer for messages that are received in each of the processors;
providing a send table and a receive table that include information about messages in each of the processors; and
providing infrastructure services for each processor that include determining if a message is present in the receive buffer, comparing received message data in the message to data in the receive table if a message is present to ensure the message received is correct, and decoding the message and copying signal data of the message to variables on the processor that receives the message, said infrastructure services including an interrupt service that is invoked upon arrival of a message, said interrupt service checking a message header and comparing the message header to information in the receive table to determine whether the message is valid, wherein a valid message is placed into the receive buffer and an invalid message is dropped.

2. The method according to claim 1 wherein each of the processors include at least one runnable, said at least one runnable generating a message and sending the message to the send buffer of the processor on which the at least one runnable is operating when the at least one runnable needs to send a data communication to a different runnable on a different processor.

3. The method according to claim 1 wherein each of the send buffer, the receive buffer, the send table, and the receive table for each processor is generated at a design time of the controller.

4. The method according to claim 1 wherein the size of each buffer is calculated using at least a message header size and a message size such that each buffer has adequate capacity to store messages.

5. The method according to claim 1 wherein each table includes information regarding message identification, message destination, message count, message size and a variable list.

6. The method according to claim 5 further comprising reconfiguring the controller to change the inter-processor communications by changing the content of at least one send table and one receive table.

7. The method according to claim 5 further comprising comparing information in a table to message header information in a corresponding message to determine if the corresponding message is corrupt.

8. A system for reconfigurable inter-processor communications in a controller, said system comprising:
multiple processors in the controller;
a send buffer and a receive buffer that is generated for each of the processors, said send buffer being used to write, store and send messages, said receive buffer being used to read, store and copy messages;
a send table and a receive table that is generated for each of the processors, said send table storing identifying information about messages being sent and said receive table storing identifying information about messages being received; and
infrastructure services programmed into the controller, said infrastructure services including protocols for sending and receiving messages between the processors in the controller, said infrastructure services including an interrupt service that is invoked upon arrival of a message, said interrupt service checking a message header and comparing the message header to information in the receive table to determine whether the message is valid, wherein a valid message is placed into the receive buffer and an invalid message is dropped.

9. The system according to claim 8 wherein each of the multiple processors include at least one runnable, said runnable generating a message and sending the message to the send buffer of the processor on which the runnable is operating when the runnable needs to send a data communication to a different runnable on a different processor.

10. The system according to claim 8 wherein each of the send buffer, the receive buffer, the send table and the receive table are generated at a design time.

11. The system according to claim 8 wherein the size of each buffer is calculated using at least a message header size and a message size such that each buffer has adequate capacity to store messages.

12. The system according to claim 8 wherein each table includes information regarding message identification, message destination, message count, message size and a variable list that is part of each message.

13. The system according to claim 8 further comprising reconfiguring the controller to change the inter-processor communications by changing the content of at least one send table and one receive table.

14. A method for reconfigurable inter-processor communications in a controller, said method comprising:
providing multiple processors in the controller;
generating a send buffer and a receive buffer for each of the processors, said send buffer being used to write, store and send messages, said receive buffer being used to read, store and copy messages;
generating a send table and a receive table for each of the processors, said send table storing identifying information about messages being sent, said receive table storing identifying information about messages being received; and
providing infrastructure services that include protocols for sending and receiving messages between the multiple processors in the controller, said infrastructure services including an interrupt service that is invoked upon arrival of a message, said interrupt service checking a message header and comparing the message header to information in the receive table to determine whether the message is valid, wherein a valid message is placed into the receive buffer and an invalid message is dropped.

15. The method according to claim 14 wherein each of the processors include at least one runnable, said runnable generating a message and sending the message to the send buffer of the processor on which the runnable is operating when the runnable needs to send a data communication to a different runnable on a different processor.

16. The method according to claim 14 wherein each of the send buffer, the receive buffer, the send table and the receive table are generated at a design time.

17. The method according to claim 14 wherein the size of each buffer is calculated using at least a message header size and a message size such that each buffer has adequate capacity to store messages.

18. The method according to claim 14 wherein each table includes information regarding message identification, message destination, message count, message size and a variable list for each message listed in the table.

19. The method according to claim 14 further comprising reconfiguring the controller to change the inter-processor communications by changing the content of at least one send and receive table.

* * * * *